Nov. 7, 1933.  S. C. KNEFEL  1,934,196

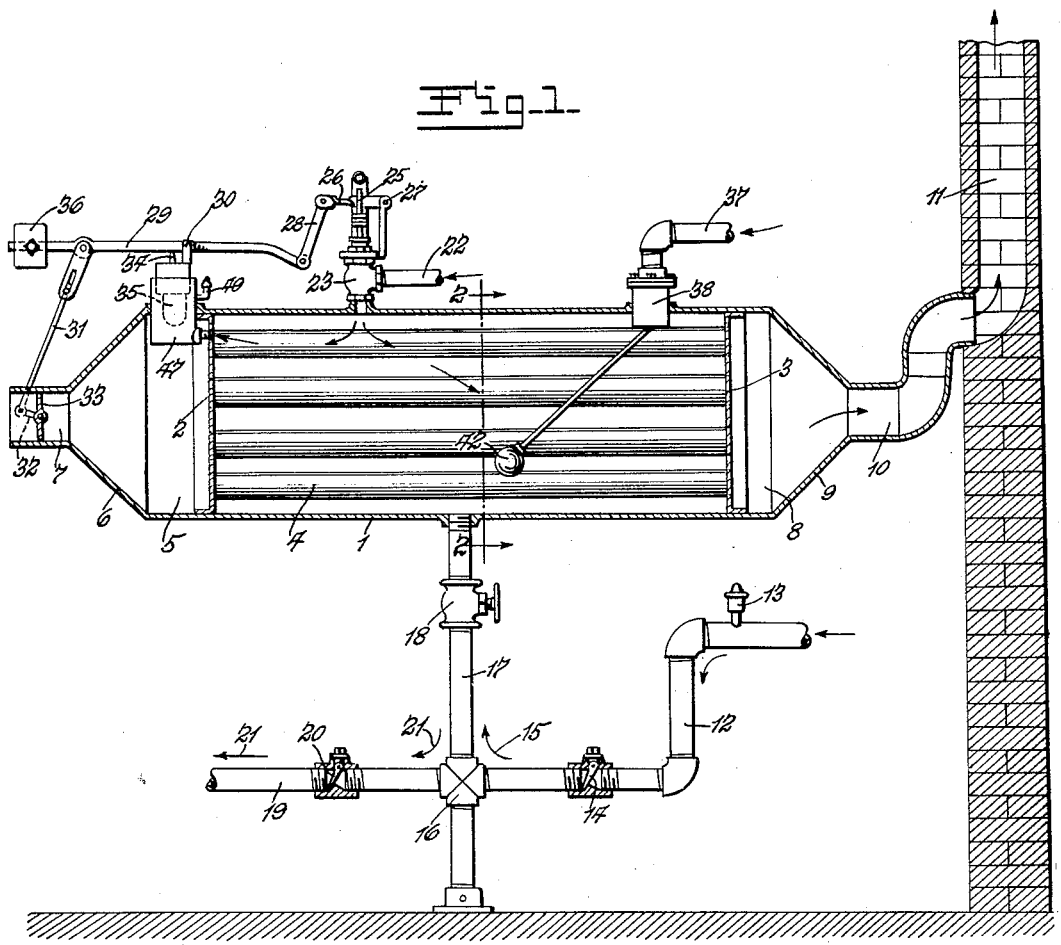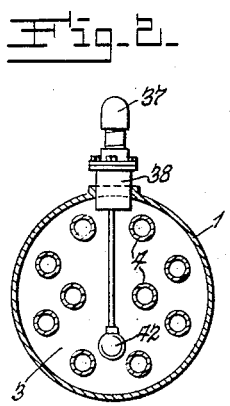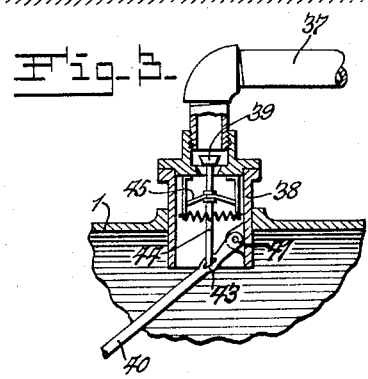

BOILER RETURN AND VACUUM TRAP

Filed Dec. 16, 1932   3 Sheets-Sheet 2

Inventor
Stanley C. Knefel
by Pippey + Kingsland
His Attorneys.

Nov. 7, 1933.   S. C. KNEFEL   1,934,196
BOILER RETURN AND VACUUM TRAP
Filed Dec. 16, 1932   3 Sheets-Sheet 3
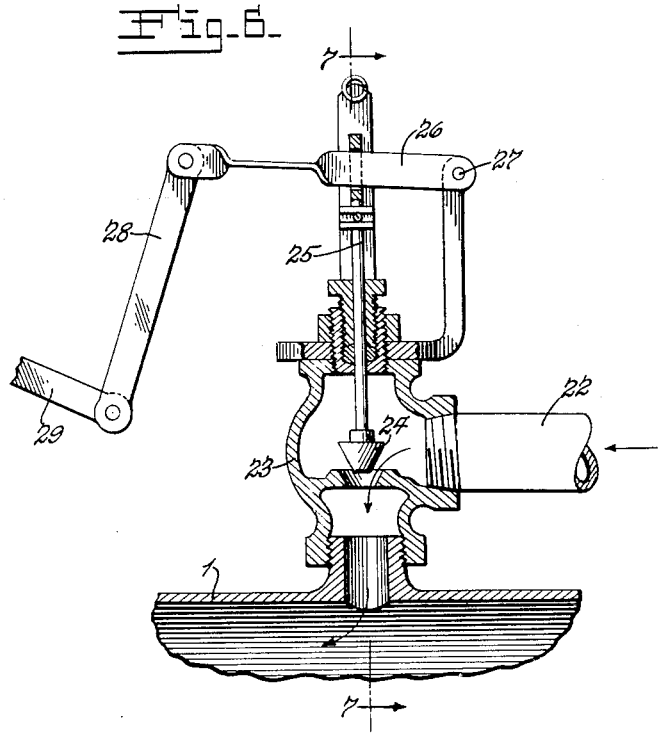
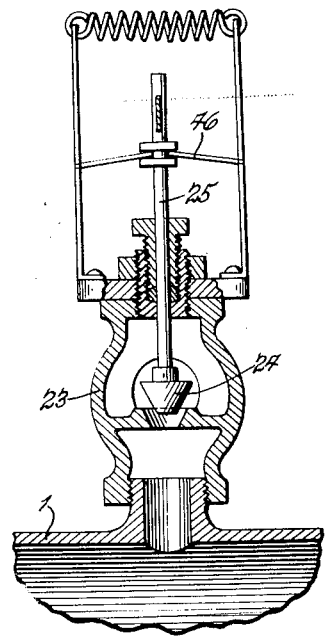
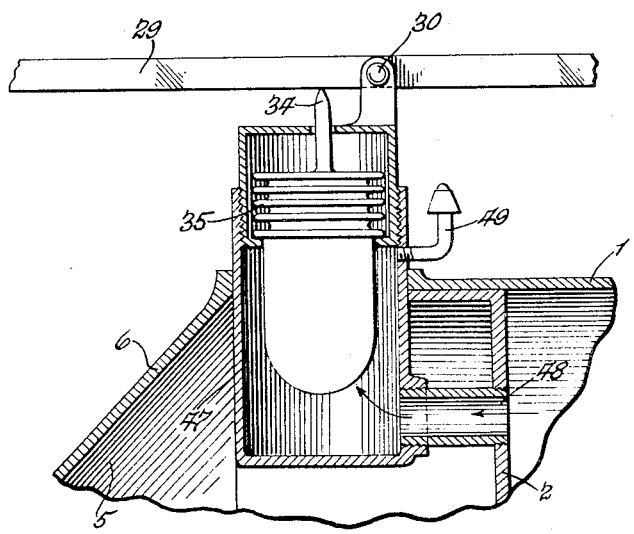
Inventor
Stanley C. Knefel
by Pripsey & Kingsland
His Attorneys Patented Nov. 7, 1933

1,934,196

UNITED STATES PATENT OFFICE 1,934,196

BOILER RETURN AND VACUUM TRAP

Stanley C. Knefel, St. Louis, Mo.

Application December 16, 1932
Serial No. 647,527

17 Claims. (Cl. 103—253)

This invention relates to an improved boiler return and vacuum trap for causing and controlling return to the boiler of water obtained by condensation of steam in the system to which the steam is supplied by the boiler.

The present invention has reference to devices in the class including the subject matter of my prior Patent No. 1,783,381, granted December 2, 1930; and this invention comprises an improved vacuum trap enclosing a float actuator arranged to operate and control a steam valve when a predetermined amount of water is enclosed in the tank. By this operation and control of the steam valve, steam is admitted to the tank and caused to eject the water from the tank to the boiler.

When the valve is opened by the float actuator, the tank becomes filled with steam, the air is ejected from the tank and a partial vacuum is created; and an object of the present invention is to equip the device with the float actuator arrangement to control the admission of steam to the vacuum tank, as stated.

The present invention further comprises an automatic regulator, including a thermostatic device located in a compartment outside the vacuum trap. In one form of the invention, the compartment may be a part of the air line through which air passes to provide cooling surfaces and thereby effect condensation of steam in the trap, or, if desired, the compartment may be located elsewhere.

Other objects of the invention are to provide an improved boiler return and vacuum trap embodying the features mentioned and also having flues extending through the vacuum trap to provide cooling surfaces for condensing the steam and creating the vacuum; to provide means for taking air from the room in which the vacuum trap is mounted instead of from the outside in order to create a circulation of air through the condensing flues; and to provide means for increasing the velocity of the air passing through the flues by a novel relative arrangement of the inlet and outlet openings.

Various other objects and advantages of the invention should be apparent from the following description, reference being made to the annexed drawings, in which:—

Fig. 1 is a sectional view of the invention, some of the pipes and other parts being in elevation.

Fig. 2 is a cross sectional view on the line 2—2 of Fig. 1.

Fig. 3 is a detail vertical sectional view of the steam valve.

Fig. 6 is an enlarged sectional view of a valve device embodied in both forms of the invention.

Fig. 7 is a sectional view of the valve device at right angles to the section of Fig. 6.

Fig. 8 is an enlarged sectional view of the automatic regulator.

Figure 4:
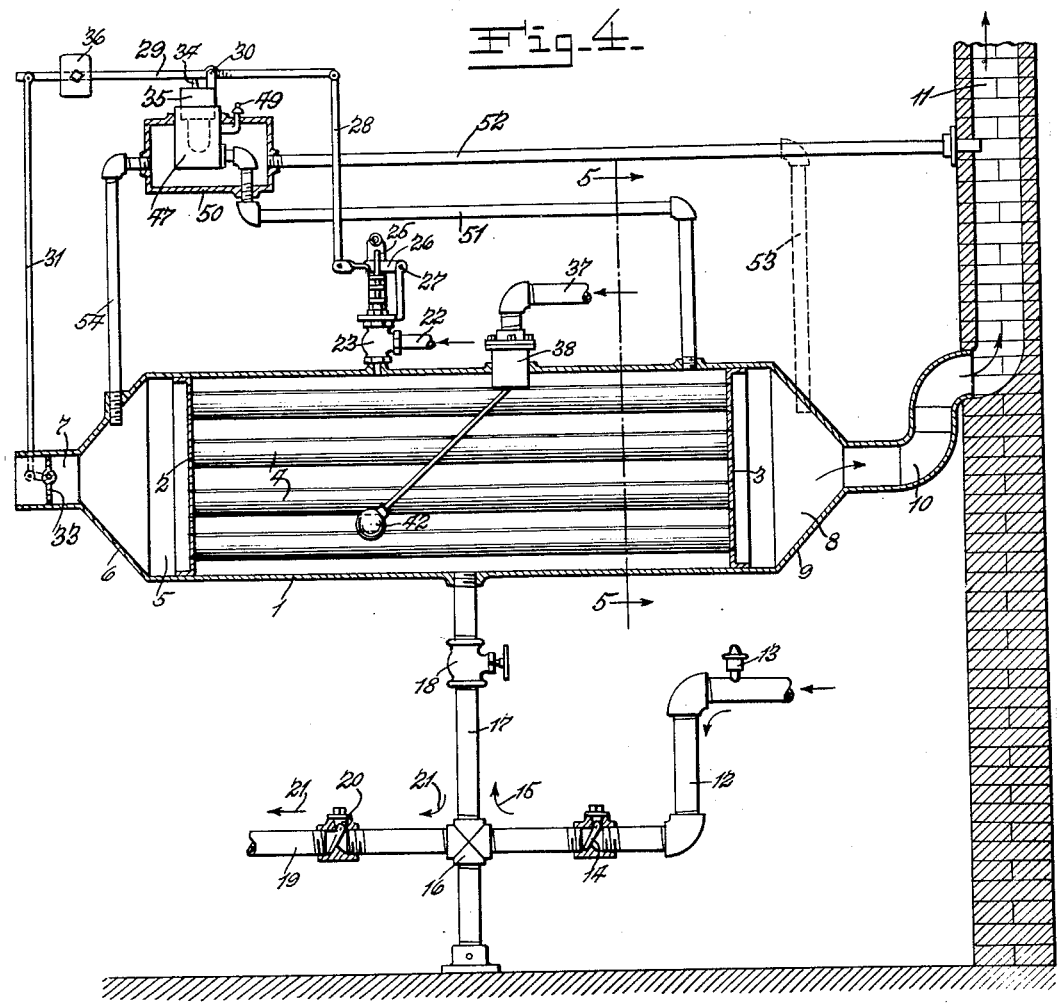
Fig. 4 is a view similar to Fig. 1, showing the compartment containing the automatic regulator in a different location.
Figure 5:
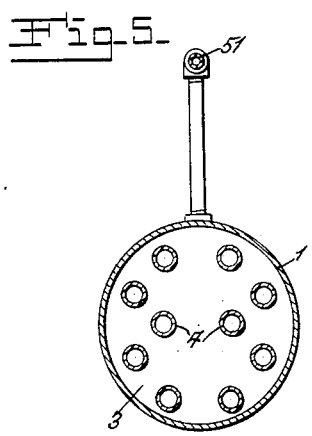
Fig. 5 is a cross sectional view on the line 5—5 of Fig. 4.

In each embodiment of the invention, the tank 1 has at one end a wall 2 and at the opposite end a wall 3. A plurality of flues 4 extend longitudinally in spaced relationship through the tank 1 and open through the walls 2 and 3. These flues are for the passage of air and they constitute cooling surfaces for condensing the steam in the tank 1 and creating a vacuum therein.

A compartment 5 is formed at one end of the tank 1 by a conical wall 6 having an air inlet passage 7 at the reduced end of the conical wall.

A compartment 8 is formed at the opposite end of the tank by a conical wall 9 having an air outlet passage 10 opening into a flue 11 and preferably of smaller diameter than the diameter of the passage 7. I have found by practice that this construction increases the velocity of the air passing through the condenser of the boiler return trap, with the result that a greater vacuum is created. The passage 7 may open directly into the room in which the device is mounted so as to take air from the room and cause that air to pass through the compartment 5, condenser tubes 4, compartment 8 and passage 10 into the flue 11 opening to the outside.

A pipe 12 is a return pipe from the system to which steam is supplied by the boiler and is for the purpose of returning to the boiler, through the operation of the present invention, water produced by condensation of steam in the system. It is considered unnecessary to illustrate the connection of the return pipe with the system for such connection may be easily made in an understood manner. The pipe 12 is equipped with an air mixer valve or device 13 of any standard commercial type, which will permit air to escape from the pipe 12 without permitting the escape of water or steam to any substantial extent. The pipe 12 has therein a check valve 14, permitting water to flow in the direction of the arrow 15 and preventing water from flowing in the opposite direction. The pipe 12 is connected with a fitting 16 from which a pipe 17 extends and opens into the tank 1. The pipe 17 is equipped with a manually operative valve device 18 of familiar construction, which may be operated and adjusted to open and to close said pipe.

The fitting 16 also constitutes a passage opening into a pipe 19 leading to the boiler (not shown) and is connected with the boiler in such a way as to discharge into the boiler water that is returned to the boiler from the system and which is accumulated by condensation of steam in the system. Such connection of a return pipe with a boiler is familiar and no showing thereof is needed to enable those skilled in the art to understand this invention. The pipe 19 is equipped with a check valve 20 of a familiar type that permits water to flow through the pipe 19 in the direction of the arrows 21 but prevents water from flowing through the valve 20 in the opposite direction.

A pipe 22 is arranged to conduct steam from the boiler and opens into a valve housing 23 that opens into the tank 1. A valve 24 controls the passage of steam through the valve housing 23. This valve 24 may be operated by a stem 25 extending to the outside of the valve housing and engaging a lever 26 having one end mounted on a pivot 27 and the opposite end pivotally connected with one end of a link 28. The opposite end of the link 28 is pivotally connected with a lever 29, which is supported on a pivot 30. A link 31 connects the lever 29 with an arm 32 having operative connection with a damper or butterfly valve 33 mounted in the passage 7.

An extension 34 from an automatic regulator device 35 of the thermostatic type engages the lever 29 and moves said lever as required to open the damper or butterfly valve 33.

A weight 36 is mounted on and is adjustable along the lever 29 to vary the resistance of said lever to operation by the automatic regulator device.

A pipe 37 from the boiler opens into a valve housing 38 that in turn opens into the tank 1. A valve 39 mounted in the valve housing, controls passage of steam from the pipe 37 into the tank 1. A float actuator device, comprising a lever 40 having one end pivotally supported at 41 and having a float 42 in connection with its opposite end, has connection 43 with the stem 44 of the valve 39, mounted in the valve housing, controls device 45, which will cooperate with the valve actuator to impart the final movements to the valve 39 and hold said valve closed or open and prevent undesirable oscillation of the valve by the float.

Similarly the valve stem 25 is engaged by a spring device 46 that will cooperate with the thermostatic regulator device to impart final movements to the valve stem 25 and thereby to the valve 24 and prevent undesired oscillation of the valve.

To this point, the devices shown in Figs. 1 and 7 are the same and like reference numerals are applied to like parts. These forms of the invention differ somewhat in the location of the automatic regulator devices.

In Figs. 1 and 8, the automatic regulator device 35 is enclosed within a chamber 47 mounted in an opening in the wall 6. A tubular passage 48 conducts steam from the tank 1 to the chamber 47. The chamber 47 is equipped with an air discharge valve 49, which permits said chamber to discharge air and to receive steam. It is clear that when the thermostatic regulator device 35 is heated by steam entering the chamber 47, the lever 29 will be operated to close the valve 24 and thus prevent the passage of steam through said valve into the tank 1, and will also open the damper or butterfly valve 33 and permit air to pass through the condenser tubes 4 to condense the steam in the tank 1 and create vacuum. When this occurs, water may flow into the tank 1 through the pipe 17. When the water rises to a sufficient height in the tank 1, the float 42 will open the valve 39 and admit steam to the tank 1.

In the arrangement shown in Fig. 4, the chamber 47 is mounted in a compartment 50 receiving steam from the tank 1 through a pipe connection 51. The valve 49 extends from the chamber 47 to the outside of the compartment 50. Air is discharged from the compartment 50 through a pipe 52, which may be extended to open into the flue 11, as indicated in solid lines, or may be provided with an extension 53 opening into the compartment 8. When the automatic regulator device 35 becomes heated by the steam entering the chamber 47 through the pipe 51, the lever 29 is operated to close the valve 24 and thereby prevent steam from passing said valve into the tank 1 and the damper or butterfly valve 33 is opened to permit free passage of air through the condenser tubes.

A pipe 54 has one end opening into the compartment 5 and the opposite end opening into the chamber 50 and thus permits a current of air to pass through said pipe 54, compartment 50 and the pipe 52 into the flue 12, or from the pipe 52 through the pipe 53 into the compartment 8. This air constitutes a cooling agent to lower the temperature thermostatic device 35 that is enclosed within the chamber 47 in the compartment 50.

In each embodiment of the invention shown, the thermostatic device 35 is supported elsewhere than within the tank 1 but is in communication with said tank 1 and receives steam therefrom. The pipes 48 and 51, constituting the passages from the tank 1 to the chamber 47 in the respective arrangements shown, subject the thermostatic device 35 to the effect of the heat of the steam only after an interval of time has elapsed after the steam has entered the tank 1. Thus, a proper coefficient of time is maintained as between the opening of the damper valve 33 and the closing of the valve 24 and obtaining the desirable function of permitting enough steam to enter the tank 1 during a sufficient period of time to eject nearly all of the water from the tank 1 before the damper valve 33 is opened to admit the cooling air to pass through the condensing flues 4. This enhances the efficiency of the device largely in comparison with a device having only a single steam inlet 37 controlled by the float device 42 and in comparison with a device having the thermostatic actuator 35 subject to the direct action of the steam inside the tank 1. These important factors have only been determined by actual experience and operation and are practical and not merely theoretical.

It must be clear that this invention obtains all of its intended objects and purposes efficiently and satisfactorily. In either of its embodiments, the invention is a compact unitary device that may be easily assembled and mounted in its operative environment and may be easily repaired and supplied with interchangeable parts. The construction and arrangement may be varied otherwise than in the specific manner shown and described without departure from the nature and principle of the invention. I do not restrict my self in any unessential particulars, but what I claim and desire to secure by Letters Patent is:

1. A device of the character described comprising a combined condenser and vacuum trap having inlets for steam and a combined inlet and outlet for water, flues extending longitudinally through and opening beyond the ends of said trap, a float device in said trap operated by water that enters said trap controlling entry of steam into said trap to eject said water therefrom, and an automatic thermostatic regulator device unconnected to said float device and controlling the passage of air through said flues after water has been ejected from said trap by steam as aforesaid.

2. A device of the character described comprising a combined condenser and vacuum trap having inlets for steam and a combined inlet and outlet for water, flues extending longitudinally through and opening beyond the ends of said trap, a float device in said trap operated by water that enters said trap controlling entry of steam into said trap to eject water therefrom, an automatic thermostatic regulator device unconnected to said float device and controlling the passage of air through said flues after water has been ejected from said trap by steam as aforesaid, and means for heating and thereby operating said regulator device to cause passage of air through said flues to condense steam in said trap and create vacuum therein after water has been ejected from said trap by said steam.

3. A device of the character described comprising a combined condenser and vacuum trap, pipes for admitting water and steam respectively into said trap and for conducting water from said trap, flues extending longitudinally through and opening beyond the ends of said trap, a float device in said trap operated by the water therein controlling passage of steam into said trap, and an automatic thermostatic regulator device unconnected to said float device and controlling the passage of air through said flues.

4. A device of the character described comprising a combined condenser and vacuum trap, pipes for admitting water and steam respectively into said trap and for conducting water from said trap, flues extending longitudinally through and opening beyond the ends of said trap and constituting cooling surfaces for condensing the steam and thereby creating a vacuum in said trap and causing water to enter said trap through said pipe therefor, a float device in said trap operated by the water therein controlling the passage of steam into said trap to eject the water therefrom, and an automatic thermostatic regulator device unconnected to said float device heated by the steam and controlling passage of air through said flues to condense the steam entering said trap.

5. A device of the character described comprising a combined condenser and vacuum trap, pipes for admitting water and steam respectively into said trap and for conducting water from said trap, flues extending longitudinally through and opening beyond the ends of said trap and constituting cooling surfaces for condensing the steam and thereby creating a vacuum in said trap and causing water to enter said trap through said pipe therefor, a float device in said trap operated by the water therein controlling the passage of steam into said trap to eject the water therefrom, an automatic thermostatic regulator device unconnected to said float device heated by the steam and controlling passage of air through said flues to condense the steam entering said trap, and means for subjecting said regulator device to the heat of steam.

6. A device of the character described comprising a combined condenser and vacuum trap having inlets for steam and a combined inlet and outlet for water, walls forming an outwardly tapered compartment at each end of said trap, one of which compartments has an air inlet and the other of which has an air outlet, flues extending longitudinally through said trap and opening into said compartments respectively, a float device in said trap operated by water that enters said trap controlling entry of steam into said trap to eject said water therefrom, and an automatic thermostatic regulator device unconnected to said float device and controlling the passage of air through said air inlet and said flues after water has been ejected from said trap by said steam.

7. A device of the character described comprising a combined condenser and vacuum trap having inlets for steam and a combined inlet and outlet for water, walls forming an outwardly tapered compartment at each end of said trap, one of which compartments has an air inlet and the other of which has an air outlet, flues extending longitudinally through said trap and opening into said compartments respectively, a float device in said trap operated by water that enters said trap controlling entry of steam into said trap to eject said water therefrom, and an automatic thermostatic regulator device unconnected to said float device and controlling the passage of air through said air inlet and said flues after water has been ejected from said trap by said steam and causing said float device to prevent entry of steam into said trap and permit the entry of water into said trap.

8. A device of the character described comprising a combined condenser and vacuum trap having inlets for steam and a combined inlet and outlet for water, walls forming compartments at the ends of said trap, condenser flues extending through said trap and opening into said compartments respectively, a float device operated by water that enters said trap for opening said steam inlet when a predetermined amount of water has entered said trap and causing steam to enter and eject said water from said trap, and automatic means unconnected with said float device and controlled by the heat of the steam for causing air to pass through said flues when water has been ejected from said trap to condense the steam confined in said trap.

9. A device of the character described comprising a combined condenser and vacuum trap having inlets for steam and a combined inlet and outlet for water, walls forming compartments at the ends of said trap, condenser flues extending through said trap and opening into said compartments respectively, a float device operated by water that enters said trap for opening said steam inlet when a predetermined amount of water has entered said trap and causing steam to enter and eject said water from said trap, and automatic means unconnected with said float device and controlled by the heat of the steam for causing air to pass through said flues when water has been ejected from said trap to condense the steam confined in said trap and substantially to prevent passage of air through said flues before said float device has been operated to admit steam to said trap.

10. A device of the character described comprising a combined condenser and vacuum trap having a combined inlet and outlet for water and having steam inlets, flues extending longitudinally through and opening beyond the ends of said trap, a float device in said trap operated by water that enters said trap controlling entry of steam into said trap to eject said water therefrom, an automatic thermostatic regulator device controlling the passage of air through said flues after water has been ejected from said trap by steam as aforesaid, and a pipe other than said steam inlets for conducting steam to said regulator device.

11. A device of the character described comprising a combined condenser and vacuum trap having a combined inlet and outlet for water and having inlets for steam, flues extending longitudinally through and opening beyond the ends of said trap, a float device in said trap operated by water that enters said trap controlling entry of steam into said trap to eject said water therefrom, an automatic thermostatic regulator device unconnected to said float device and controlling the passage of air through said flues after water has been ejected from said trap by steam as aforesaid, means other than said condenser and vacuum trap forming a chamber to confine steam about said regulator device, and means for conducting steam into said chamber to heat and thereby operate said regulator device to cause passage of air through said flues after water has been ejected from said trap by said steam.

12. A device of the character described comprising a combined condenser and vacuum trap, pipes for admitting water and steam respectively into said trap and for conducting water from said trap, flues extending longitudinally through and opening beyond the ends of said trap, a float device in said trap operated by water that enters said trap controlling passage of steam into said trap, an automatic thermostatic regulator device unconnected to said float device and controlling the passage of air through said flues, and means other than said condenser and vacuum trap for confining steam to heat said regulator device.

13. A device of the character described comprising a combined condenser and vacuum trap, pipes for admitting water and steam respectively into said trap and for conducting water from said trap, flues extending longitudinally through and opening beyond the ends of said trap and constituting cooling surfaces for condensing the steam and thereby creating a vacuum in said trap and for causing water to enter said trap through said pipe therefor, a float device in said trap operated by the water therein controlling passage of steam into said trap to eject water therefrom, an automatic thermostatic regulator device unconnected to said float device heated by the steam and controlling the passage of air through said flues to condense the steam entering said trap, and means for heating said regulator device by steam other than the steam in said trap.

14. A device of the character described comprising a combined condenser and vacuum trap, pipes for admitting water and steam respectively into said trap and for conducting water from said trap, flues extending longitudinally through and opening beyond the ends of said trap and constituting cooling surfaces for condensing the steam and thereby creating a vacuum in said trap and causing water to enter said trap through said pipe therefor, a float device in said trap operated by the water therein controlling the passage of steam into said trap to eject the water therefrom, an automatic thermostatic regulator device unconnected to said float device controlling passage of air through said flues to condense the steam entering said trap, and means for subjecting said regulator device to the heated steam other than the steam in said trap.

15. A device of the character described comprising a combined condenser and vacuum trap having inlets for steam and a combined inlet and outlet for water, walls forming an outwardly tapered compartment at each end of said trap, one of which compartments has an air inlet and the other of which has an air outlet, flues extending longitudinally through said trap and opening into said compartments respectively, a float device in said trap operated by water that enters said trap controlling entry of steam into said trap to eject said water therefrom, and a thermostatic regulator device mounted in one of said compartments and unconnected to said float device and controlling the passage of air through said air inlet and said flues after water has been ejected from said trap by said steam.

16. A device of the character described comprising a combined condenser and vacuum trap having inlets for steam and a combined inlet and outlet for water, walls forming an outwardly tapered compartment at each end of said trap, one of which compartments has an air inlet and the other of which has an air outlet, flues extending longitudinally through said trap and opening into said compartments respectively, a float device in said trap operated by water that enters said trap controlling entry of steam into said trap to eject said water therefrom, a thermostatic regulator device unconnected to said float device and subjected to the temperature of the air passing from said air inlet before said air enters said flues controlling the passage of air through said air inlet and said flues after water has been ejected from said trap by said steam and causing said float device to prevent entry of steam into said trap and prevent the entry of water into said trap.

17. A device of the character described comprising a combined condenser and vacuum trap having inlets for steam and a combined inlet and outlet for water, walls forming compartments at the end of said trap, condenser flues extending through said trap and opening into both of said compartments, a float device operated by water that enters said trap for opening one of said steam inlets when a predetermined amount of water has entered said trap and causing steam to enter and eject water from said trap, and means unconnected with said float device and controlled by heat other than the heat in said trap for causing air to pass through said flues when water has been ejected from said trap to condense the steam confined in said trap.

STANLEY C. KNEFEL.